US010523534B2

(12) United States Patent
Park et al.

(10) Patent No.: US 10,523,534 B2
(45) Date of Patent: Dec. 31, 2019

(54) METHOD AND APPARATUS FOR MANAGING USER QUALITY OF EXPERIENCE IN NETWORK

(71) Applicant: Samsung Electronics Co., Ltd, Gyeonggi-do (KR)

(72) Inventors: Ki-Beom Park, Gyeonggi-do (KR); Byeong-Soo Yeon, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 45 days.

(21) Appl. No.: 15/507,719

(22) PCT Filed: Aug. 29, 2014

(86) PCT No.: PCT/KR2014/008092
§ 371 (c)(1),
(2) Date: Feb. 28, 2017

(87) PCT Pub. No.: WO2016/032034
PCT Pub. Date: Mar. 3, 2016

(65) Prior Publication Data
US 2017/0302539 A1    Oct. 19, 2017

(51) Int. Cl.
*H04L 12/24* (2006.01)
*H04L 12/26* (2006.01)

(52) U.S. Cl.
CPC ...... *H04L 41/5067* (2013.01); *H04L 41/5016* (2013.01); *H04L 43/08* (2013.01); *H04L 43/50* (2013.01)

(58) Field of Classification Search
None
See application file for complete search history.

(56) References Cited

U.S. PATENT DOCUMENTS 6,643,612 B1 * 11/2003 Lahat .................. G06F 1/14
                                                          702/182
8,073,968 B1 * 12/2011 Shah .................. H04L 45/00
                                                          709/232
(Continued)

FOREIGN PATENT DOCUMENTS

JP    2007-536794 A    12/2007
KR    1020010076095    8/2001
(Continued)

OTHER PUBLICATIONS

International Search Report dated May 11, 2015 in connection with International Application No. PCT/KR2014/008092, 4 pages.
(Continued)

*Primary Examiner* — Ernest G Tacsik

(57) ABSTRACT

The present invention relates to a method and an apparatus for measuring and managing user quality of experience in a network, and a system for measuring user quality of experience in a network may comprise: a system controller for configuring measurement criteria for user quality of experience between network elements and controlling so that the network elements measure the user quality of experience according to the set criteria; a network element for transmitting a packet to a counterpart network element in order to measure, according to the control of the system controller, the user quality of experience for at least one counterpart network element; and a counterpart network element for receiving the packet from the network element and transmitting a response packet.

17 Claims, 12 Drawing Sheets

(56) References Cited

U.S. PATENT DOCUMENTS

| | | | |
|---|---|---|---|
| 9,398,347 B2* | 7/2016 | Jadallah | H04L 41/5067 |
| 2002/0032612 A1* | 3/2002 | Williams | G06Q 10/08 |
| | | | 705/26.1 |
| 2005/0075831 A1* | 4/2005 | Ilic | G06F 11/0709 |
| | | | 702/179 |
| 2010/0020717 A1* | 1/2010 | McGregor | H04B 17/23 |
| | | | 370/252 |
| 2013/0114446 A1* | 5/2013 | Liu | H04W 24/10 |
| | | | 370/252 |
| 2013/0322276 A1* | 12/2013 | Pelletier | H04W 72/085 |
| | | | 370/252 |
| 2013/0322285 A1* | 12/2013 | Fidler | H04L 43/0882 |
| | | | 370/252 |
| 2014/0086073 A1 | 3/2014 | Baykal et al. | |
| 2014/0092736 A1* | 4/2014 | Baillargeon | H04W 72/1226 |
| | | | 370/230 |
| 2014/0119221 A1 | 5/2014 | Park et al. | |
| 2014/0169183 A1* | 6/2014 | Allan | H04L 43/10 |
| | | | 370/248 |
| 2014/0189074 A1 | 7/2014 | Parker | |
| 2014/0293799 A1 | 10/2014 | Park et al. | |
| 2016/0192233 A1* | 6/2016 | Sarker | H04L 47/11 |
| | | | 370/236 |

FOREIGN PATENT DOCUMENTS

| | | |
|---|---|---|
| KR | 1020100007672 | 1/2010 |
| KR | 1020120042114 | 5/2012 |
| KR | 1020120093548 | 8/2012 |
| KR | 1020140053654 | 5/2014 |
| KR | 1020140118100 | 10/2014 |
| WO | 2005107187 A1 | 11/2005 |

OTHER PUBLICATIONS

Written Opinion of the International Searching Authority dated May 11, 2015 in connection with International Application No. PCT/KR2014/008092, 6 pages.

Korean Intellectual Property Office, "Notice of Preliminary Rejection," Application No. KR10-2013-0090346, dated Oct. 11, 2019, 15 pages.

* cited by examiner

METHOD AND APPARATUS FOR MANAGING USER QUALITY OF EXPERIENCE IN NETWORK

CROSS-REFERENCE TO RELATED APPLICATION(S)

The present application claims priority under 35 U.S.C. § 365 to International Patent Application No. PCT/KR2014/008092 filed Aug. 29, 2014, entitled "METHOD AND APPARATUS FOR MANAGING USER QUALITY OF EXPERIENCE IN NETWORK", which is incorporated herein by reference into the present disclosure as if fully set forth herein.

BACKGROUND

The present invention relates to a service providing network and particularly, relates to a method and apparatus for measuring and managing a user Quality of Experience (QoE) in a network in which various wired and wireless networks are mingled.

Recently, according as a mobile communication service evolves from existing 2nd Generation (2G) and 3G to 4G, a network providing the mobile communication service has evolved in a form in which various mobile communication network equipments, and wired communication equipments such as a switch, a router, etc. that construct backhaul and/or backbone networks, etc. are compositively constructed. Particularly, in the advanced wireless network environment, according as various small cell equipments are emerging besides existing macro equipments, effectively measuring and managing a user QoE for a large number of network equipments is becoming the field of a core technology for service providers who administer networks.

Conventional service providers are employing a scheme of additionally installing separate equipments in a network, to measure and manage a QoE for network equipments. FIG. 1 illustrates a system construction of measuring and managing a QoE using additionally installed equipments in a network according to the conventional art. As illustrated in FIG. 1, to provide a service to a mobile terminal 101, a mobile communication network includes an Element Management System (EMS) 100, a plurality of base stations 120-1 to 120-N, a switch/router 110 and a gateway 108 and, additionally to measure and manage a QoE for each of equipments (or Network Elements (NEs)) included in the mobile communication network, includes a tester manager 102, an external tester 1 (transmitter) 104 and an external tester 2 (reflector) 106. That is, the conventional mobile communication network is using a scheme of installing additional equipments for a test, and using the additionally installed equipments to measure a QoE for each mobile communication network element. For example, when intending to measure a QoE for the base station 1 120-1 and the gateway 108, it measures the QoE by using a scheme of generating a packet for QoE measurement in the external tester 1 104 installed around the base station 1 120-1 by the control of the tester manager 102 and transmitting the generated packet to the external tester 2 106 installed around the gateway 108 and then, responding to this by the external tester 2 106.

However, because such the conventional QoE measurement scheme has to install and operate the separate equipments such as the external tester and the tester manager, there is a disadvantage of being inefficient in aspects of an installation cost and a maintenance cost. Further, because the conventional scheme measures in the nearby installed external tester instead of directly measuring a QoE in a network element that intends to measure the QoE, it is difficult to acquire the exact measurement result about a desired network element, and the actual condition is that measurement is difficult when a problem occurs in a corresponding network element itself. Also, there is a disadvantage in which the conventional QoE measurement scheme is dependent on a measurement protocol performed in the external tester, and the measurement result is subordinate to a function of the external tester.

DETAILED DESCRIPTION OF THE INVENTION

Technological Problem

Accordingly, an exemplary embodiment of the present invention is to provide a system of measuring and managing a user Quality of Experience (QoE) in a network, and a method thereof.

Another exemplary embodiment of the present invention is to provide a method and apparatus of measuring and managing an end-to-end QoE, without additionally installing equipment for QoE measurement in a mobile communication network that includes various network elements (or network equipments).

A further exemplary embodiment is to provide a method and apparatus in which each of network elements measures and manages a QoE in a mobile communication network.

A yet another exemplary embodiment of the present invention is to provide a method and apparatus in which an Element Management System (EMS) controls and sets QoE measurement criteria of network elements and manages the QoE measurement result in a mobile communication network.

A still another exemplary embodiment of the present invention is to provide a method and apparatus in which a specific network element measures a QoE with a counterpart network element based on QoE measurement criteria that are set by an EMS, and provides the measurement result to the EMS in a mobile communication network.

A still another exemplary embodiment of the present invention is to provide a method and apparatus in which a network element measures a QoE regardless of a QoE measurement protocol in a mobile communication network.

A still another exemplary embodiment of the present invention is to provide a method and apparatus in which a network element periodically measures a QoE with a counterpart network element, and provides statistics information on the QoE during a constant time to an EMS in a mobile communication network.

A still another exemplary embodiment of the present invention is to provide a method and apparatus in which, when a problem takes place in a mobile communication network, each network element measures a QoE by the control of an EMS, and provides the measurement result to the EMS to identify and manage the network in which the problem has occurred.

A still another embodiment of the present invention is to provide a method and apparatus of measuring a QoE in OpenF low based Software Defined Networking (SDN).

According to an exemplary embodiment of the present invention, a method of a system controller for measuring a user quality of experience in a network includes the processes of transmitting a user quality-of-experience measurement request message that comprises user quality-of-experience measurement criteria about a link between counterpart network elements, to at least one network element, receiving the user quality-of-experience measurement result from the at least one network element, and providing the received user quality-of-experience result to a system operator.

According to an exemplary embodiment of the present invention, a method of a network element for measuring a user quality of experience in a network, a method of a network element for measuring a user quality of experience in a network includes the processes of receiving a user quality-of-experience measurement request message that comprises user quality-of-experience measurement criteria for a link between network elements, from a system controller, measuring a user quality of experience for the link between the network elements on the basis of the user quality-of-experience measurement criteria, and transmitting the user quality-of-experience measurement result to the system controller.

According to an exemplary embodiment of the present invention, a method of a network element for measuring a user quality of experience in a network includes the processes of receiving a packet for user quality-of-experience measurement from another network element, and transmitting a response packet to the received packet, to the another network element. The network element and the another network element can be any one of a base station, a switch, a router and a gateway.

According to an exemplary embodiment of the present invention, a method of a system for measuring a user quality of experience in a network includes the processes of setting user quality-of-experience measurement criteria between network elements in a system controller, and transmitting a user quality-of-experience measurement request message that comprises the set criteria to the network elements, and in a specific network element, transmitting a packet to at least one counterpart network element on the basis of the user quality-of-experience measurement criteria received from the system controller, and in the counterpart network element, transmitting a response packet to the packet received from the specific network element, in the specific network element, using the response packet, to generate the user quality-of-experience measurement result, and in the specific network element, transmitting the generated user quality-of-experience measurement result to the system controller. The network elements can mean at least one of a base station, a switch, a router and a gateway.

According to an exemplary embodiment of the present invention, an apparatus of a system controller for measuring a user quality of experience in a network includes a test requesting unit setting user quality-of-experience measurement criteria about a link between counterpart network elements, to at least one network element, and transmitting a user quality-of-experience measurement request message that comprises the set criteria, a measurement result management unit receiving the user quality-of-experience measurement result from the at least one network element, and a result providing unit providing the received user quality-of-experience result to a system operator.

According to an exemplary embodiment of the present invention, an apparatus of a network element for measuring a user quality of experience in a network includes a 1st layer receiving a user quality-of-experience measurement request message that comprises user quality-of-experience measurement criteria for a link between network elements, from a system controller, and transmitting the user quality-of-experience measurement result to the system controller, a 2nd layer acquiring the user quality-of-experience the measurement result from a packet received from a counterpart network element, and a 3rd layer generating a packet according to a protocol on the basis of the user quality-of-experience measurement criteria, to transmit, and receiving a packet from the counterpart network element.

According to an exemplary embodiment of the present invention, an apparatus of a network element for measuring a user quality of experience in a network includes a layer receiving a packet for user quality-of-experience measurement from another network element, and transmitting a response packet to the received packet, to the another network element. The network element and the another network element can be any one of a base station, a switch, a router and a gateway.

According to an exemplary embodiment of the present invention, a system for measuring a user quality of experience in a network includes a system controller setting user quality-of-experience measurement criteria between network elements, and controlling the network elements to measure a user quality of experience by the set criteria, a network element transmitting a packet to at least one counterpart network element to measure a user quality of experience for the counterpart network element in accordance with the control of the system controller, and a counterpart network element receiving a packet from the network element, and transmitting a response packet. The network elements can include at least one of a base station, a switch, a router and a gateway.

BEST MODE FOR EMBODIMENT OF THE INVENTION

A preferred exemplary embodiment of the present invention is described below with reference to the accompanying drawings. And, in describing the present invention, if it is judged that a concrete description of related well-known functions or constructions can unnecessarily obscure the gist of the present invention, a detailed description thereof is omitted.

A technology of measuring and managing an inter network element, i.e., end-to-end Quality of Experience (QoE) without additionally installing equipment for user QoE measurement in a mobile communication network that includes various network elements (or network equipments) will be described. Here, the QoE can be called a Service Level Agreement (SLA) as a different term. Accordingly, in the following description, although the QoE and the SLA are mixed, their meanings will be the same. Also, in the following description, a network node, a network element and network equipment have all the same meaning.

Figure 1:
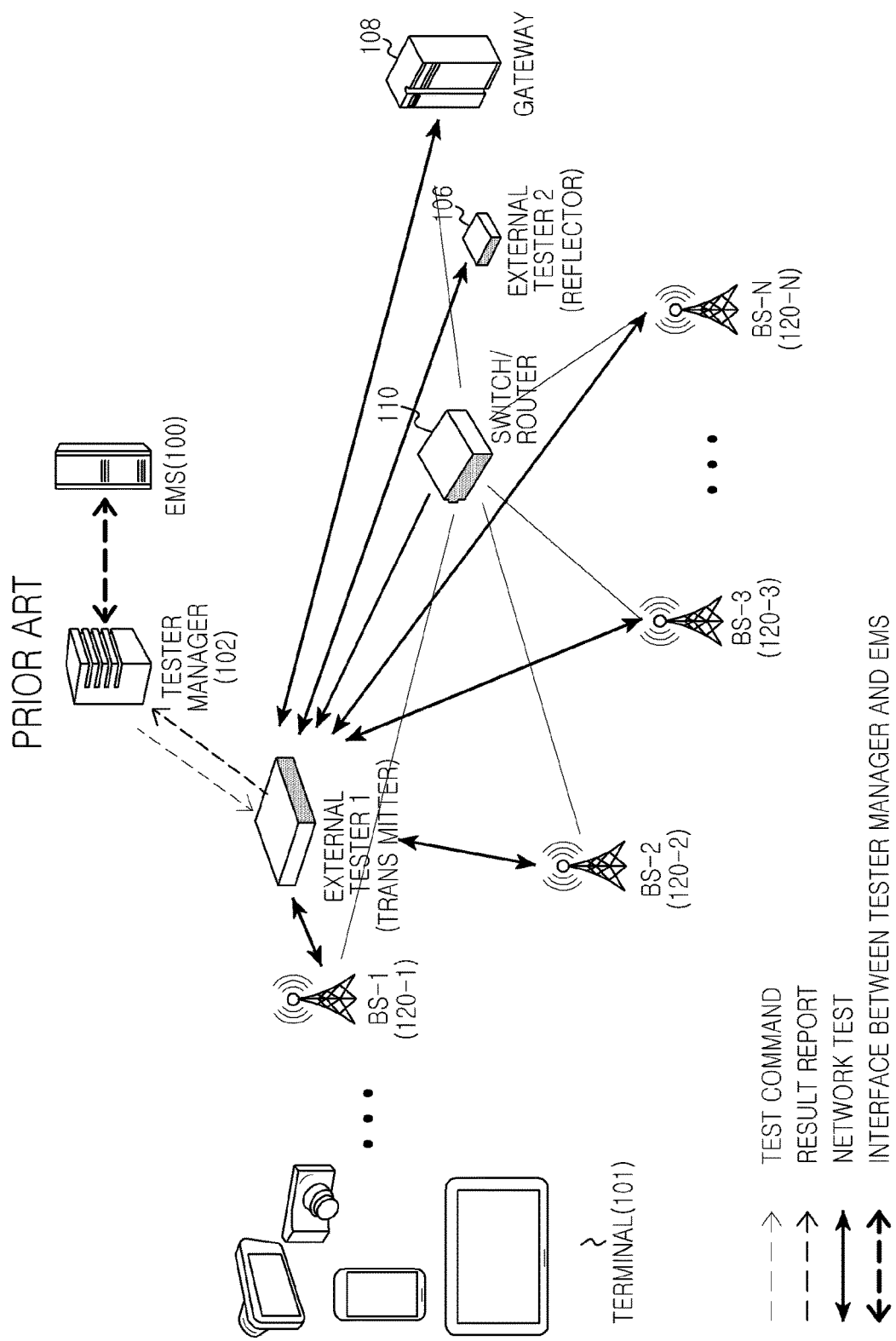
FIG. 1 is a diagram illustrating a system construction of measuring and managing a user quality of experience using additionally installed equipments in a network according to the conventional art.
Figure 2:
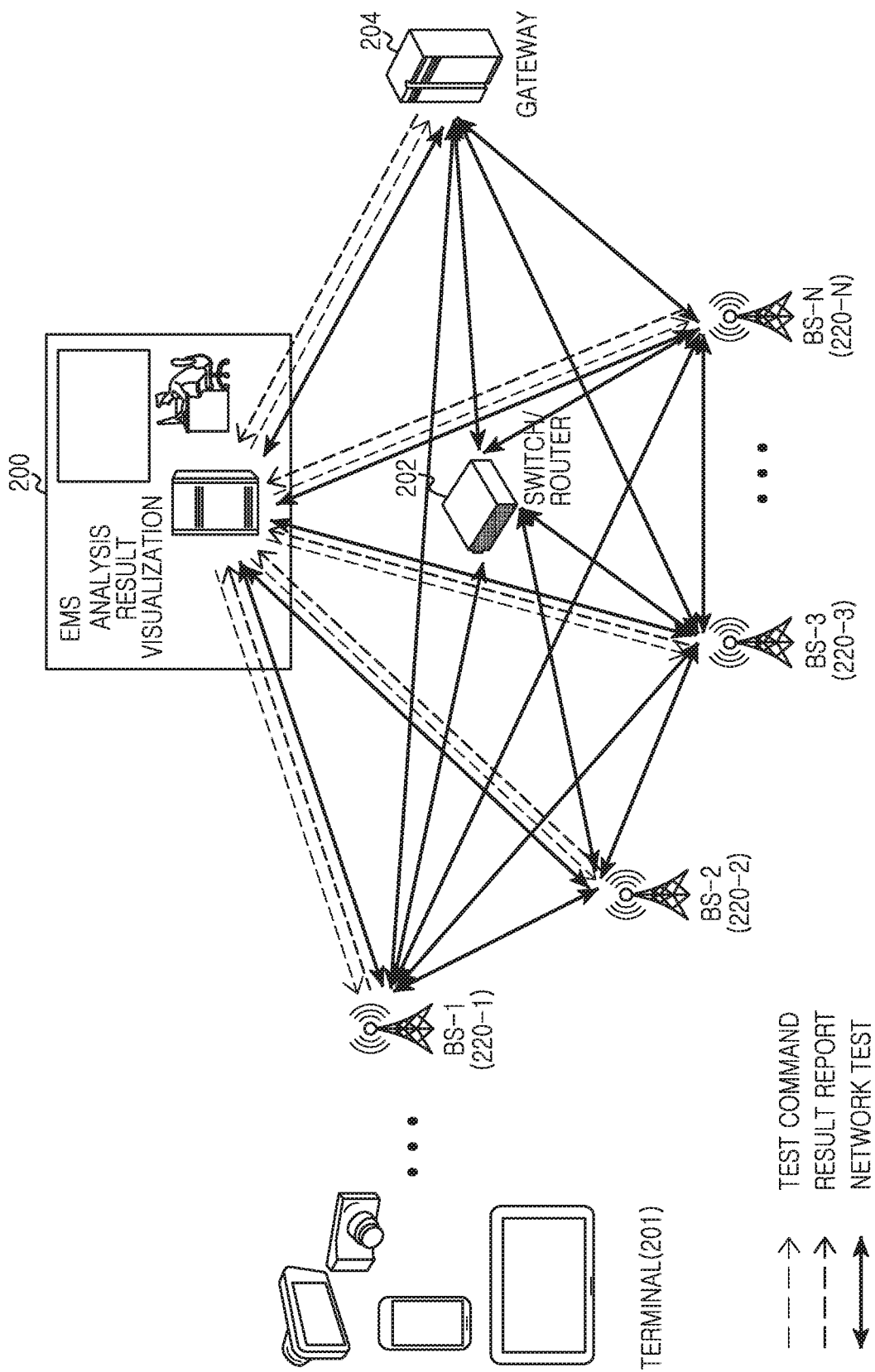
FIG. 2 is a diagram illustrating a construction of a system of measuring and managing a user quality of experience in a network according to an exemplary embodiment of the present invention.

FIG. 2 illustrates a construction of a system of measuring and managing a user quality of experience in a network according to an exemplary embodiment of the present invention.

As illustrated in FIG. 2, a QoE measurement and management system according to an exemplary embodiment of the present invention is comprised of an Element Management System (EMS) 200, a plurality of base stations 220-1 to 220-N, a switch/router 202 and a gateway 204 that are equipments necessary for providing a service to a mobile terminal 101. That is, a mobile communication network according to an exemplary embodiment of the present invention uses a scheme of measuring a QoE in each network element (or network equipment), without installing additional equipments for test.

In other words, an exemplary embodiment of the present invention directly measures a QoE in each network element such as a base station, a base station controller, core equipment, a switch and a router that configure the mobile communication network. Also, in an exemplary embodiment of the present invention, each network element can operate as a transmitter of generating and sending a packet for active monitoring in accordance with the control of the EMS 200 as well, and can operate as a reflector of sending a response packet to the received packet for active monitoring as well. Also, in an exemplary embodiment of the present invention, the EMS 200 can control the QoE measurement of the network elements. That is, the EMS 200 can set test criteria for the QoE measurement of the network elements in accordance with the control of a system operator, and can request periodic QoE measurement to the network elements so as to statistically manage a QoE for a flow between the network elements, and can request QoE measurement to at least one network element at a necessary time point so as to diagnose a temporary problem of a network as well. Here, the test criteria are criteria used for measuring the QoE between the network elements, and can include a Packet Per Second (PPS), a packet size, a Differentiated Services Code Point (DSCP), a test link, a traffic amount, etc. Also, the EMS 200 according to an exemplary embodiment of the present invention can analyze the QoE measurement result received from the network elements, and visualize this and provide to an operator.

For example, the EMS 200 can set test criteria for a flow of the base station 1 220-1 and the base station 2 220-2 or a flow of the base station 1 220-1 and the switch/router 202, and can request QoE measurement for a channel with the base station 2 220-2 or the switch/router 202, to the base station 1 220-1. The base station 1 220-1 can operate as a transmitter in accordance with the request of the ESM 200, and transmit a packet to the base station 2 220-2 or the switch/router 202 based on the test criteria that have been set by the EMS 200. If so, the base station 2 220-2 or switch/router 202 having received the packet operates as a reflector, and transmits a response packet to the base station 1 220-1. The base station 1 220-1 can analyze the received packet and acquire a QoE metric (or SLA metric), and transmit metric values that are acquired at a current time point, to the EMS 200, or transmit the statistics result about metric values periodically that are acquired during a preset time point, to the EMS 200. The EMS 200 can provide the received metric values or statistics result to an operator.

As illustrated in the aforementioned FIG. 2, by directly measuring a QoE in each network element without installing additional equipment in a network, an exemplary embodiment of the present invention can obtain a cost saving effect and, when a problem occurs in a specific network element or between network elements, can exactly diagnose the network or link in which the problem has occurred.

Figure 3:
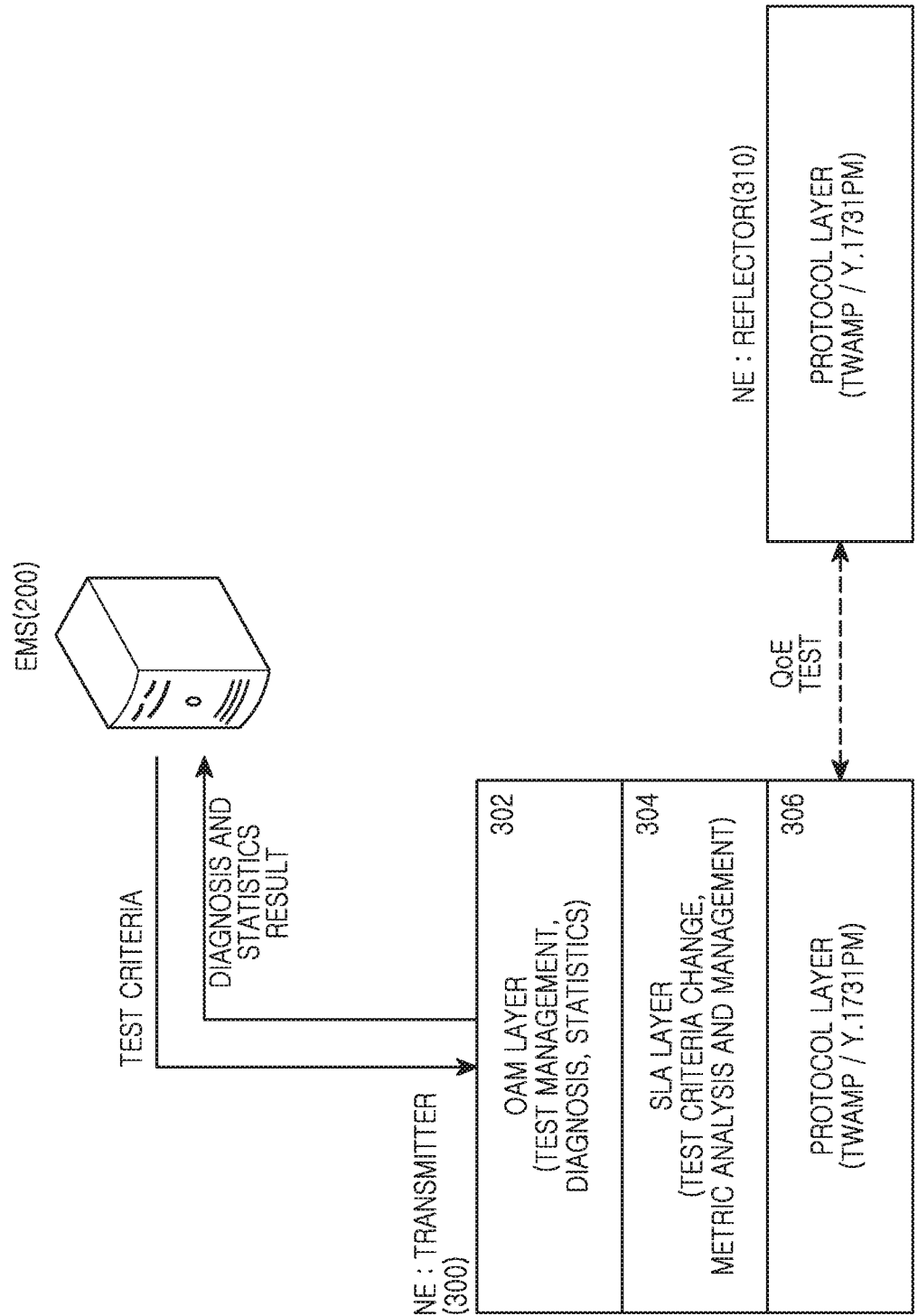
FIG. 3 is a diagram illustrating a framework layer structure for QoE measurement according to an exemplary embodiment of the present invention.

FIG. 3 illustrates a framework layer structure for QoE measurement according to an exemplary embodiment of the present invention.

The EMS 200 manages each of various network elements such as a plurality of base stations, a switch/router, a gateway, etc. In accordance with an exemplary embodiment of the present invention, the EMS 200 can control QoE measurement functions of the network elements. In detail, the EMS 200 can set a flow of QoE measurement of the network elements, test criteria and a mapping relationship of the flow and the test criteria. In accordance with an exemplary embodiment of the present invention, the EMS 200 can set test criteria for a flow between two network elements 300 and 310, and transmit the test criteria to the transmitter 300 that will begin a test among the two network elements 300 and 310, and request QoE measurement. Here, the test criteria are criteria used for measuring a QoE between the network elements, and can include a Packet Per Second (PPS), a packet size, a Differentiated Services Code Point (DSCP), a test link, a traffic amount, etc. In an exemplary embodiment of the present invention, the test criteria for the flow are indexed, and the indexed test criteria are called a profile. Also, the EMS 200 according to an exemplary embodiment of the present invention can receive the QoE diagnosis result and/or statistics result from the transmitter 300, and analyze this and provide in the form of visual information to an operator.

The network element having received a QoE measurement request from the EMS 200 can operate as the transmitter 300. The transmitter 300 can consist of an Operation, Administration and Maintenance (OAM) layer 302, a Service Level Agreement (SLA) layer 304 and a protocol layer 306, and perform QoE measurement. That is, the OAM layer 302 of the transmitter 300 records test criteria received from the EMS in a DB, and determines if it has to periodically measure a QoE for the sake of QoE statistics during a preset time or if one-time QoE measurement is required for the sake of temporary QoE diagnosis, and instructs the QoE measurement including the test criteria to the SLA layer 304. Also, the OAM layer 302 can determine the validity or non-validity of the QoE measurement request received from the EMS 200. Also, the OAM layer 302 of the transmitter 300 can acquire the QoE diagnosis result about the transmitter 300 and the reflector 310 at a current time point from network quality related metric values that are generated in the SLA layer 304, and transmit the acquired diagnosis result to the EMS 200. Also, the OAM layer 302 of the transmitter 300 can use the network quality related metric values that are periodically generated during a preset time in the SLA layer 304, to acquire the QoE statistics result about the transmitter 300 and the reflector 310 during the preset time, and transmit the acquired statistics result to the EMS 200.

The SLA layer 304 of the transmitter 300 provides a QoE measurement command of the OAM layer 302 to the protocol layer 306. Also, the SLA layer 304 of the transmitter 300 can analyze a packet received from the reflector 310 through the protocol layer 306, to generate various network quality related metric values, and manage the generated metric values. Here, the network quality related metric values can include a packet count, a bandwidth, a loss, rearranging, duplicate, a delay, a hop count, statistical jitter, real-time jitter, a Rating-value (R-value), and a Mean Opinion Score (MOS). The SLA layer 304 of the transmitter 300 can generate the network quality related metric values irrespective of a protocol of a received packet. This scheme will be described below in detail in FIG. 7.

The protocol layer 306 of the transmitter 300 performs a QoE test, by encoding and transmitting a test packet following a protocol (e.g., Y.1731 Performance Monitoring (PM), Two-Way Active Measurement Protocol (TWAMP)) for QoE measurement based on test criteria. The protocol layer 306 of the transmitter 300 receives a packet from the reflector 310, and decodes the received packet and transmits to the SLA layer 304. Here, the TWAMP supports an authentication and encryption function and therefore, can solve a problem of being vulnerable to various Denial of Service (DoS) attacks, etc. that can take place when an Internet Control Message Protocol (ICMP) ping test is carried out.

A network element having received the test packet from the network element operating as the transmitter 300 operates as the reflector 310, and adds its own information to the received test packet and then encodes and transmits to the transmitter 300.

Figure 4:
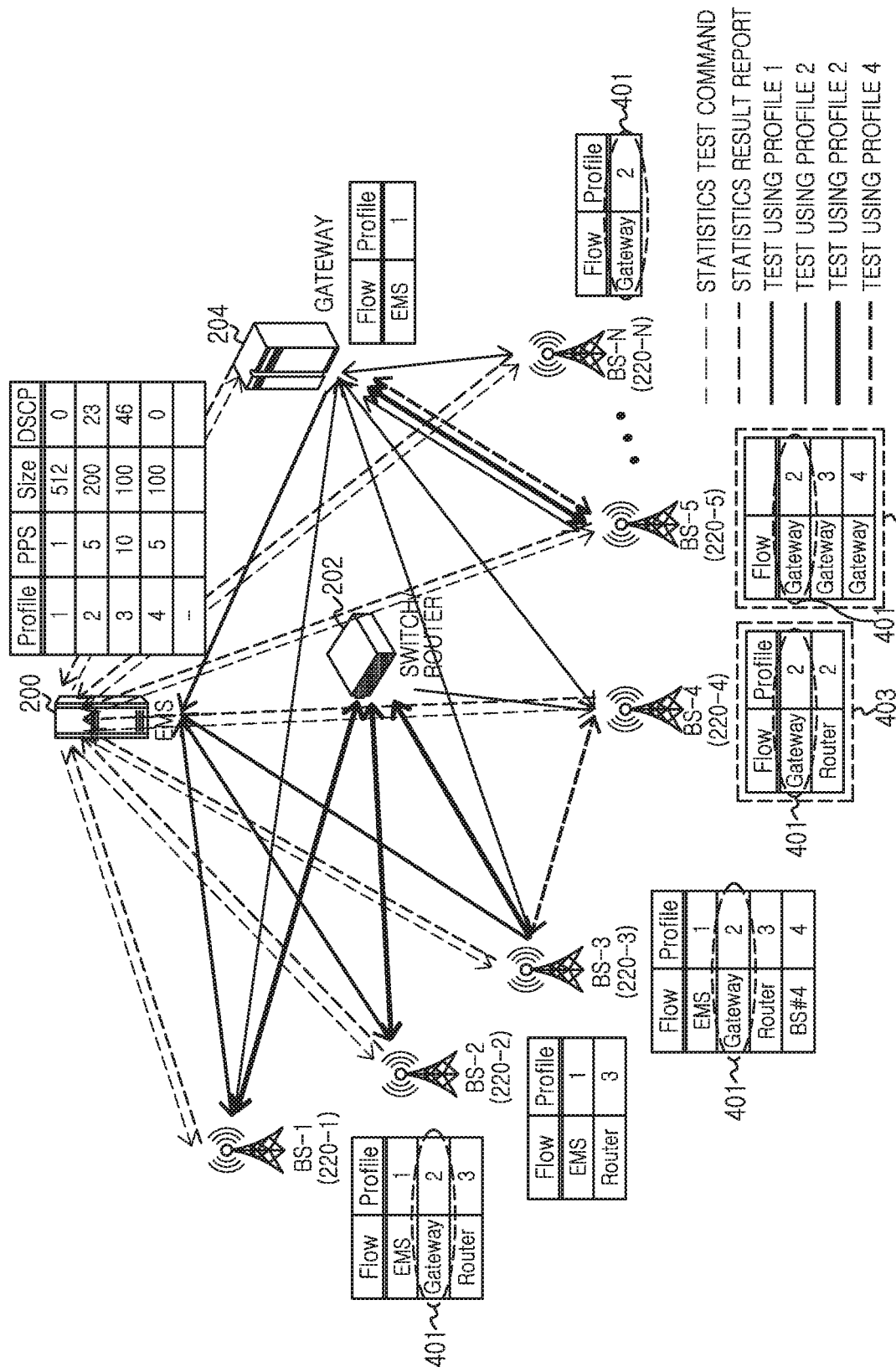
FIG. 4 is a diagram illustrating a structure of measuring a QoE for a plurality of network elements based on a flow and a profile in an EMS in accordance with an exemplary embodiment of the present invention.

FIG. 4 illustrates a structure of measuring a QoE for a plurality of network elements based on a flow and a profile in an EMS in accordance with an exemplary embodiment of the present invention.

Referring to FIG. 4, the EMS 200 sets a flow and a profile for a network constituent element. Here, the flow can mean a network element link to perform QoE measurement. Assuming that a network element that performs a role of a transmitter sending a packet is a source node and a network element that receives the packet and sends a response packet is a destination node, the flow can be represented as source node IP/Port (TCP, UDP) and/or destination node IP/Port (UDP) information. The profile is a test criterion used for measuring a QoE of a corresponding flow, and can include a Packet Per Second (PPS), a packet size, a Differentiated Services Code Point (DSP), a test link, a traffic amount, etc. The EMS 200 can index a profile indicating various test criteria and store in a table form. For example, it can store a profile table indicating that a test criterion of a profile 1 is "pps: 1, size: 512, DSCP: 0", and a test criterion of a profile 2 is "pps: 5 size: 200, DSCP: 23".

The EMS 200 can set a profile on the basis of a network element and/or a flow. That is, the EMS 200 can set the same profile for a plurality of flows in which a specific network element is a source node, and can set the same profile for a plurality of flows in which a specific network element is a designation node. Also, the EMS 200 can set mutually different profiles for a plurality of flows in which source nodes are identical and destination nodes are mutually different. For example, the EMS 200 can set profiles for two flows (a flow for a gateway and a flow for a router) in which a base station 4 220-4 is a source node, identically by a profile 2. For another example, the EMS 200 can set (401) profiles for five flows in which the gateway 204 is a destination node, by a profile 2. For further example, the EMS 200 can set (405) profiles for respective mutually different three flows in which a base station 5 220-5 is a source node and the gateway 204 is a destination node, all differently by a profile 2, a profile 3, and a profile 4 as well.

Also, in accordance with an exemplary embodiment of the present invention, by changing test criteria included in a specific profile, the EMS 200 can collectively change test criteria of all network elements that use the corresponding profile.

The plurality of base stations 220-1 to 220-N, the switch/router 202 and the gateway 204 are network elements that directly perform QoE measurement with a counterpart network element in accordance with the control of the EMS 200. The plurality of base stations 220-1 to 220-N, the switch/router 202 and the gateway 204 each receive a flow indicating a QoE measurement object and profile information indicating test criteria to be used for QoE measurement for each flow, from the EMS 200. That is, the network elements each can receive profile information by flow that indicates a mapping relationship between a flow and a profile, and perform QoE measurement for a destination node that the received profile information by flow each indicates. The network elements each can store the received profile information by flow in a table form, and periodically perform QoE measurement for a corresponding destination node.

Figure 5:
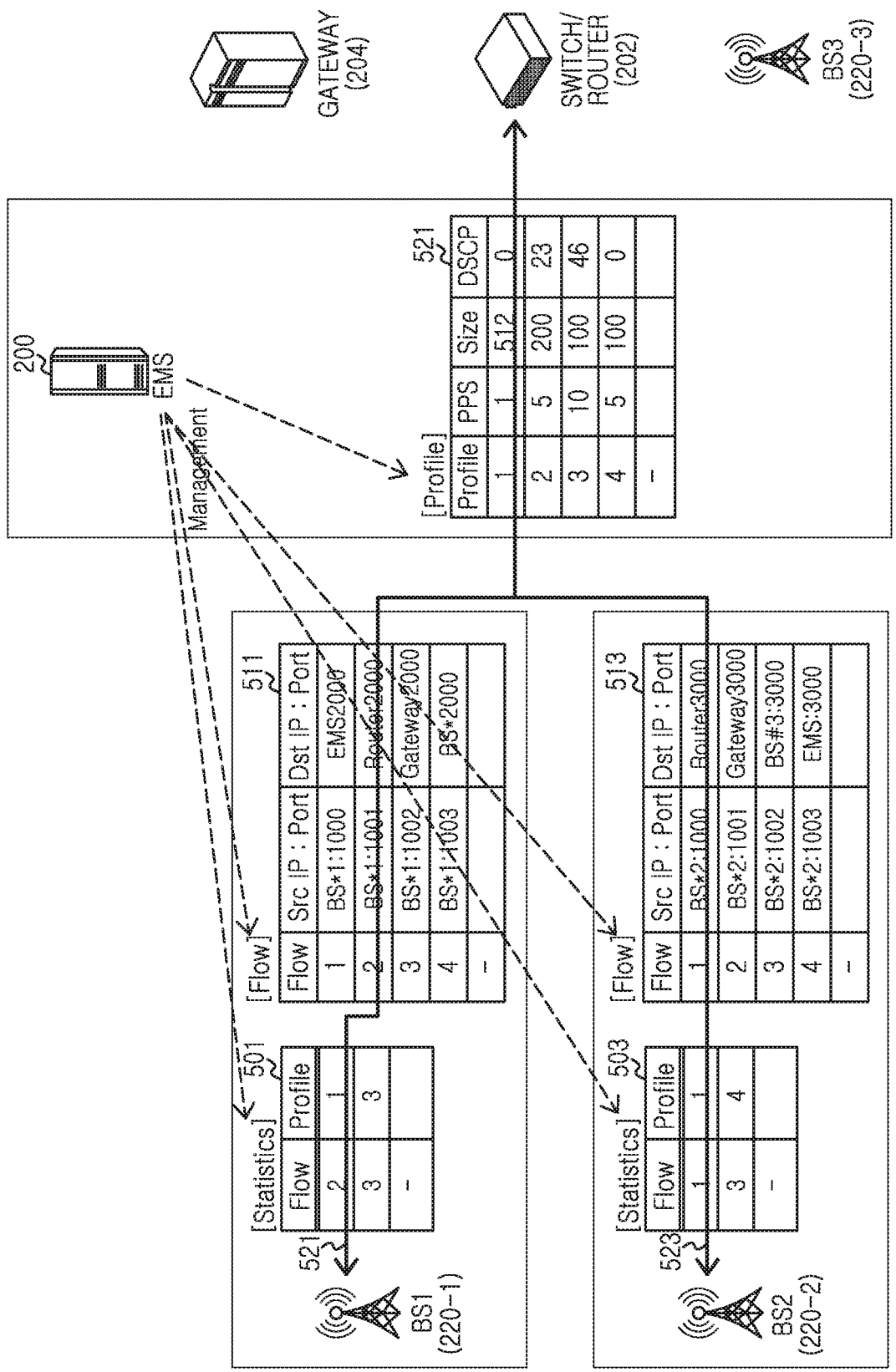
FIG. 5 is a diagram illustrating an example of setting measurement criteria for a plurality of network elements in an EMS in accordance with an exemplary embodiment of the present invention.

FIG. 5 illustrates an example of setting measurement criteria for a plurality of network elements in an EMS in accordance with an exemplary embodiment of the present invention.

Referring to FIG. 5, the EMS 200 can set and store a profile table 521 having indexed a profile that indicates various test criteria. At this time, the EMS 200 can transmit the profile table 521 to the base station 1 220-1 and/or the base station 2 220-2, to enable the two base stations to store the same profile table. Also, the EMS 200 can set flow tables 511 and/or 513 having indexed flow information about each base station, and transmit the flow tables 511 and/or 513 to the respective corresponding base stations. Also, the EMS 200 can map each of the flow and the profile and then, set statistics tables 501 and/or 503 that indicate the profile mapped to the flow of each base station, and transmit the set statistics tables 501 and/or 503 to the respective corresponding base stations.

The base station 1 220-1 having received the statistics table 501, the flow table 511 and the profile table 521 from the EMS 200 can check that it has to perform QoE measurement for a flow 2 and a flow 3 through the statistics table 501, and check that, for the flow 2, it has to perform QoE measurement using a profile 1 and, for the flow 3, it has to perform QoE measurement using a profile 3.

The base station 1 220-1 can check that the flow 2 indicates "source node IP: Port=BS #1: 11001, destination node IP: Port=Router: 2000", and check that the profile 1 mapped to the flow 2 is "PPS=1, Size=512, DSCP=0", and on the basis of this, perform a test for QoE measurement with the router 202 that is a destination node. Also, the base station 2 220-2 can check that the flow 1 indicates "source node IP: Port=BS #2: 11000, destination node IP: Port=Router: 1000", and check that the profile 1 mapped to the flow 1 is "PPS=1, Size=512, DSCP=0", and on the basis of this, perform a test for QoE measurement with the router 202 that is the destination node. Here, by changing information of the profile 1 in the profile table 521 and transmitting the changed profile table 521 to the base station 1 220-1 and the base station 2 220-2, the EMS 200 can concurrently change test criteria for the flow 2 of the base station 1 220-1 and test criteria for the flow 1 of the base station 2 220-2.

Here, in accordance with an exemplary embodiment of the present invention, the base station 1 220-1 and the base station 2 220-2 each can perform periodical QoE measurement based on the statistics tables 501 and 503, the flow tables 511 and 513 and the profile table 521 received from the EMS 200, to acquire statistics information about a QoE during a constant time duration. In accordance with another exemplary embodiment, it is undoubted that the base station 1 220-1 and the base station 2 220-2 each can utilize the statistics tables 501 and 503, the flow tables 511 and 513 and the profile table 521 previously received from the EMS 200, for the sake of QoE diagnosis according to a request of the MS 200.

Figure 6:
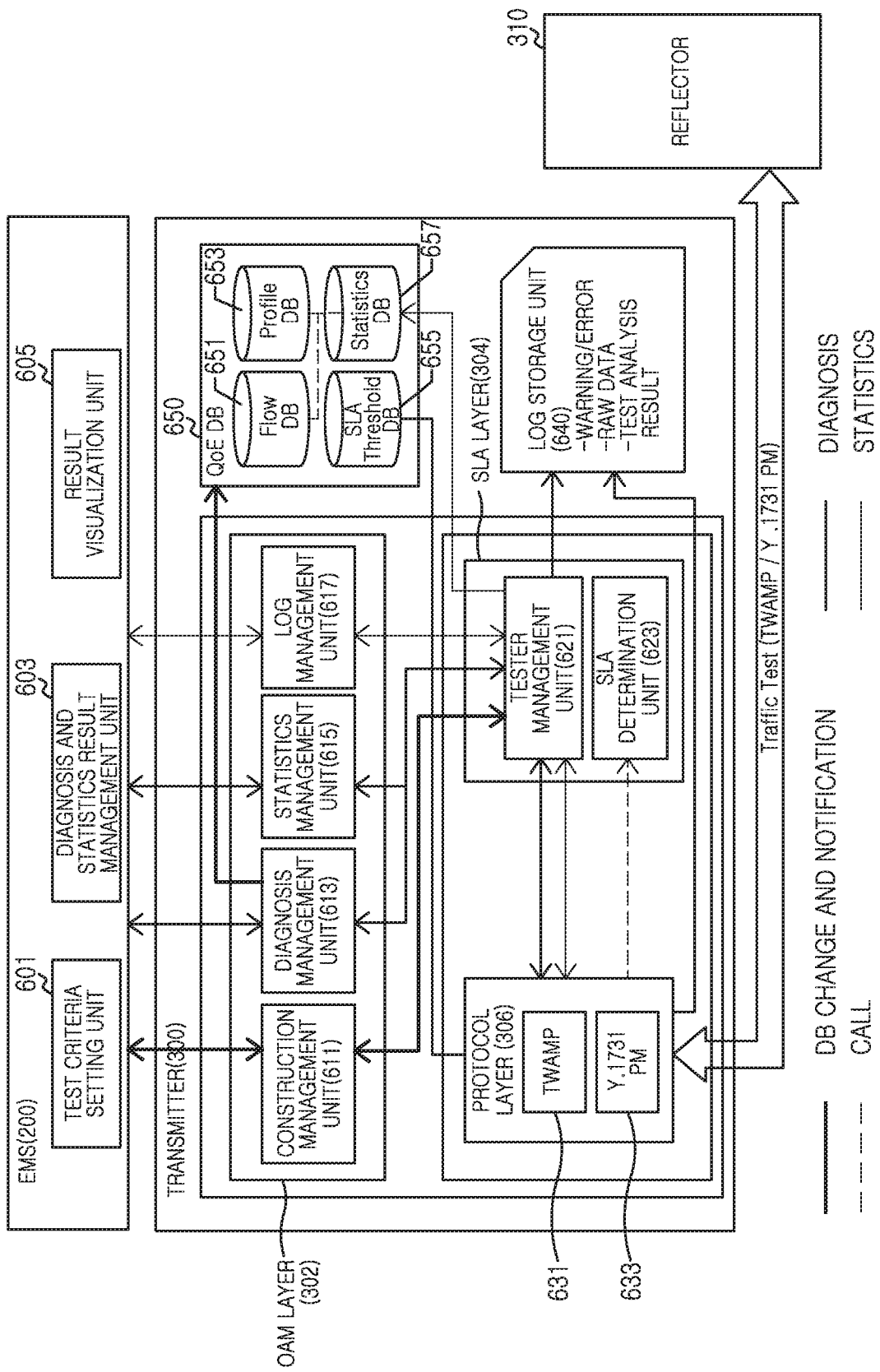
FIG. 6 is a diagram illustrating a structure of a network element that operates as a transmitter for QoE measurement with an EMS in accordance with an exemplary embodiment of the present invention.

FIG. 6 illustrates a structure of a network element that operates as a transmitter for QoE measurement with an EMS in accordance with an exemplary embodiment of the present invention.

Referring to FIG. 6, the EMS 200 manages each of various network elements such as a plurality of base stations, a switch/router, a gateway, etc. In accordance with an exemplary embodiment of the present invention, the EMS 200 includes a test criteria setting unit 601, a diagnosis and statistics result management unit 603, and a result visualizing unit 605, thereby being capable of controlling QoE measurement functions of the network elements.

The test criteria setting unit 601 of the EMS 200 sets test criteria for QoE measurement. Particularly, the test criteria setting unit 601 can set and change a flow for each network element, a profile indicating the test criteria and a mapping relationship of the flow and the profile in accordance with the control of a system operator.

The test criteria setting unit 601 can request each network element to periodically measure a QoE during a constant time duration and transmit the statistics result about this. To acquire the QoE statistics result about respective network elements, the test criteria setting unit 601 can previously set a table that indicates a flow, a profile, and a mapping relationship of the flow and the profile, and transmit information about the set table to the respective network elements.

Also, when a problem takes place due to a temporary obstacle, etc. of a network, to determine a link in which the problem has occurred or determine the cause of the link in which the problem has occurred, the test criteria setting unit 601 can request at least one network element to measure a QoE of a current time point for at least one flow and transmit the diagnosis result about this. To acquire the QoE diagnosis result of a desired network link, the test criteria setting unit 601 can directly receive an input of flow and profile information that indicates the network link that will perform QoE measurement in accordance with operator control, and can transmit the inputted flow and profile information to corresponding network elements. In another exemplary embodiment, the test criteria setting unit 601 can use the previously set profile information to perform QoE diagnosis, for the sake of QoE statistics, in accordance with the control of a system operator as well.

The diagnosis and statistics result manager 603 receives the QoE measurement result from a network element that operates as the transmitter 400 and stores. The diagnosis and statistics result manager 603 can distinguish the QoE measurement result into the QoE statistics result that is acquired during a constant time duration and the QoE diagnosis result that is acquired for a specific time point, to store and manage. Here, the specific time point can be a system operator request time point or a preset event occurrence time point.

The result visualizing unit 605 performs a function of processing the QoE measurement result into visual information and providing to a system operator. The result visualizing unit 605 can distinguish the QoE measurement result into the QoE statistics result and the QoE diagnosis result, and provide.

Through the aforementioned scheme, the system operator can efficiently manage and operate a network on the basis of an exact QoE for each network element.

Next, the transmitter 300 is each of network elements such as a base station, a base station controller, core equipment, a switch and a router that construct a mobile communication network, and can perform an operation of generating and sending a packet for active monitoring in accordance with the control of an EMS. Here, an exemplary embodiment of the present invention uses an active monitoring scheme and therefore, though not performing time synchronization between network equipments, exemplary embodiments of the present invention are applicable.

The transmitter 300 can include an OAM layer 302, an SLA layer 304, a protocol layer 306, a QoE DB 650 and a log storage unit 640. Particularly, the OAM layer 302 can include a construction management unit 611, a diagnosis management unit 613, a statistics management unit 615 and a log management unit 615. And, the SLA layer 304 can include a tester management unit 621 and an SLA determination unit 623. Also, the protocol layer 306 can include a TWAMP (631) or Y.1731 PM (633) protocol. And, the QoE DB 650 can include a flow DB 651, a profile DB 653, an SLA threshold DB 655 and a statistics DB 657.

The construction management unit 611 of the OAM layer 302 records and updates flow, profile and statistics table related information received from the EMS 200, in each DB included in the QoE DB 650, and forwards the flow information and profile information by flow to the SLA layer 304.

The diagnosis management unit 613 of the OAM layer 302 can determine if a QoE diagnosis command received from the EMS 200 is valid. For example, the diagnosis management unit 613 checks if parameters that a system operator has directly set have valid values from the EMS 200. For example, it determines if the diagnosis command is valid by comparing a processing capacity set by the system operator and an actual processing capacity of a system in the diagnosis command. If the processing capacity set by the system operator is greater than the actual processing capacity of the system, the diagnosis management unit 613 can determine that the QoE diagnosis command is not valid. If the diagnosis command is not valid, the diagnosis management unit 613 can transmit a diagnosis failure message to the ESM 200. In contrast, if the diagnosis command is valid, the diagnosis management unit 613 receives the QoE diagnosis result from the SLA layer 304, and transmits the received QoE diagnosis result to the EMS 200.

The statistics management unit 615 of the OAM layer 302 analyzes the periodical QoE measurement result that is generated while a QoE statistics function is performed, to acquire the QoE statistics result during a constant time, and stores the acquired QoE statistics result in the statistics DB 657, and transmits to the EMS 200.

The log management unit 615 of the OAM layer 302 generates a log file that indicates the QoE quality measurement processing and result, and transmits to the EMS 200. The log file can be generated based on various event (e.g., warning/error) information, raw data, the periodical analysis result and the temporary analysis result that are recorded in the log storage unit 640. In an exemplary embodiment of the present invention, storing the log file is for analyzing in detail a problem link, a quality deterioration cause, etc. based on the log file. For this, the log file can be stored in various forms such as txt, csv formats, etc.

The tester management unit 621 of the SLA layer 304 receives a QoE diagnosis or QoE statistics command requesting QoE measurement, from the OAM layer 302, and reconfigures the received command and provides to the protocol layer 306. The tester management unit 621 performs a function for determining the validity or non-validity of the received command and, if not valid, notifying that the QoE measurement command is not valid to the EMS 200 through the OAM layer 302. That is, the tester management unit 621 can check if a protocol related parameter is valid before performing encoding in accordance with a protocol. For example, it can check if IP, Port and profile information of a source node and destination node included in a QoE measurement command is a valid value. If it is determined that a specific parameter value is not valid, the tester management unit 621 controls and processes a function for notifying a QoE measurement failure and cause. Also, the tester management unit 621 analyzes the QoE measurement command to check a test count, and controls and processes such that a QoE test is performed by the checked count. If the QoE measurement result is received from the protocol layer 306, the tester management unit 621 forwards the measurement result to the diagnosis management unit 613 or the statistics management unit 615.

The SLA determination unit 623 of the transmitter 300 analyzes a packet received from the reflector 310 through the protocol layer 306, to generate various network quality related metric values, and manages the generated metric values. Here, the network quality related metric values can include a packet count, a bandwidth, a loss, rearranging, duplicate, a delay, a hop count, statistical jitter, real-time jitter, a Rating-value (R-value), and a Mean Opinion Score (MOS). The SLA determination unit 623 of the transmitter 300 can generate the network quality related metric values irrespective of the protocol of the received packet. This scheme will be described below in detail in FIG. 7.

By encoding and transmitting a TWAMP (631) or Y.1731 PM (633) protocol based test packet based on test criteria provided from the tester management unit 621, the protocol layer 306 performs a QoE test. Also, the protocol layer 306 receives a packet from the reflector 310, and decodes the received packet and transmits to the SLA layer 304.

The flow DB 651 of the QoE DB 650 can store network link information that is a QoE measurement object, i.e., an IP and port number of a source node and/or an IP and port number of a destination node. The flow DB 651 includes mutually different information by network element.

The profile DB 653 of the QoE DB 650 indexes and stores test criteria for QoE measurement. The test criteria can include at least one of a Packet Per Second (PPS), a packet size, a Differentiated Services Code Point (DSCP), a test link, and/or a traffic amount. The profile DB 653 includes the same profile information for profiles having the same index, although having been stored in mutually different network elements.

To generate a real-time alarm at QoE quality diagnosis, the SLA threshold DB 655 has a threshold value for each metric value. That is, in case where a measured metric value exceeds the threshold value, the SLA threshold DB 655 notifies this to the EMS 200, to enable a system operator to recognize that the metric value between corresponding network elements exceeds the threshold value.

To acquire the QoE statistics result, the statistics DB 657 includes profile mapping information by flow previously received from the EMS 200.

The log storage unit 640 stores various event (e.g., warning/error) information generated for the sake of QoE diagnosis or statistics execution, raw data, the periodical analysis result and the temporary analysis result.

A network element having received a test packet from the network element that operates as the transmitter 300 operates as the reflector 310, and adds its own information to the received test packet and then encodes and transmits to the transmitter 300.

Lastly, the reflector 310 is each network element such as a base station, a base station controller, core equipment, a switch and a router constructing a mobile communication network, and can perform an operation of receiving a packet for active monitoring and sending a response packet.

Figure 7:
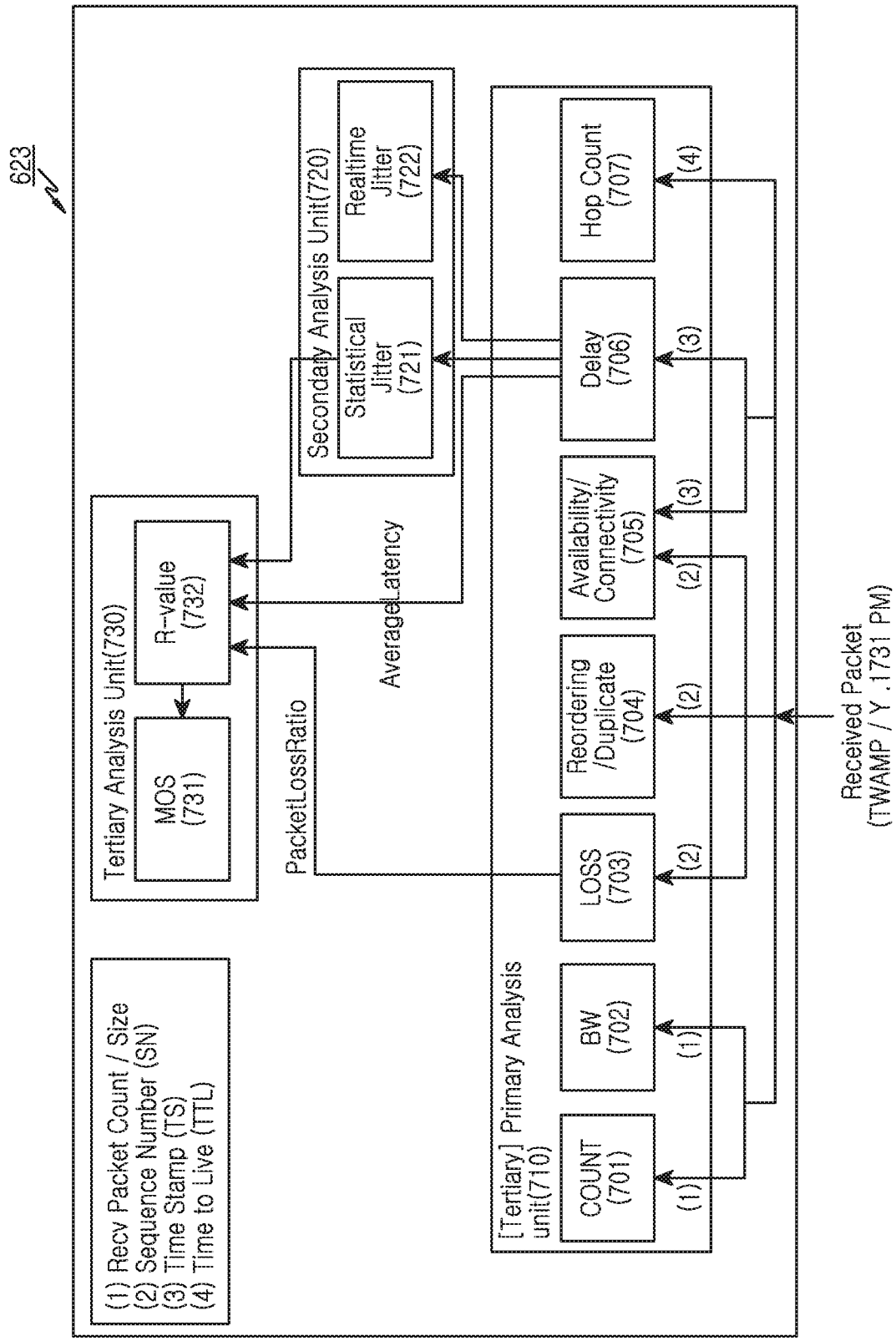
FIG. 7 is a diagram illustrating an example of extracting a QoE metric from a received quality measurement packet in accordance with an exemplary embodiment of the present invention.

FIG. 7 illustrates an example of extracting a QoE metric from a received quality measurement packet in accordance with an exemplary embodiment of the present invention.

Referring to FIG. 7, in accordance with an exemplary embodiment of the present invention, the SLA determination unit 623 can extract and/or determine QoE and SLA metric information from the received packet regardless of a protocol of the received packet, by using raw data of the received packet.

A scheme of extracting a QoE metric from the received packet in the SLA determination unit 623 can be distinguished into three steps. That is, the SLA determination unit 623 can be divided into a primary analysis unit 710, a secondary analysis unit 720, and a tertiary analysis unit 730.

The primary analysis unit 710 can acquire the count and size of received packets from one raw data and, on the basis of this, acquire COUNT 701 and BandWidth (BW) 702. Also, the primary analysis unit 710 can use a sequence number of the received packet, to acquire Loss (703) and Rearranging/Duplicate (704) information. Also, the primary analysis unit 710 can use a time stamp of the received packet, to acquire Delay (706) information, and can use the sequence number and time stamp, to acquire Availability/Connectivity 705. Also, in a case of an IP packet, the primary analysis unit 710 can use Time To Live (TTL), to acquire Hop Count (707) information.

The secondary analysis unit 720 can acquire current jitter information on the basis of a delay and previous jitter that are determined by a previously received packet and delay information that is determined by a currently received packet. At this time, the jitter information can include a statistical jitter 721 and a real-time jitter 722.

The tertiary analysis unit 730 can acquire an R-value 732 using an average latency or average delay that is acquired from the delay (706) information acquired using each received packet, a packet loss ratio that is acquired from the loss (703) information, and the statistical jitter 721, and acquire a Mean Opinion Score (MOS) 731 from the acquired Rating-value (R-value) 732.

Figure 8:
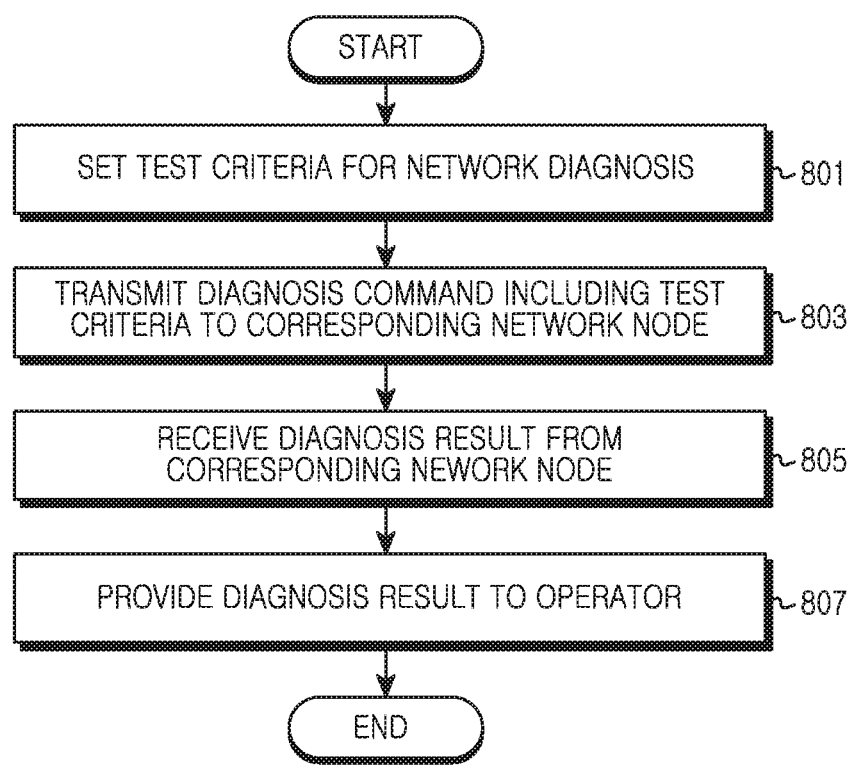
FIG. 8 is a diagram illustrating a diagnosis procedure of an EMS according to an exemplary embodiment of the present invention.

FIG. 8 illustrates a diagnosis procedure of an EMS according to an exemplary embodiment of the present invention. Here, the EMS can perform the diagnosis procedure for at least one network element when a temporary obstacle situation is sensed in a network. Also, the EMS can perform the diagnosis procedure for at least one network element by a request of a system operator.

Referring to FIG. 8, in step 801, the EMS 200 sets test criteria for network diagnosis. At this time, the EMS 200 can set the test criteria for all network elements that itself controls for the sake of network diagnosis as well, and select only specific network elements in which a problem is estimated to have occurred, to set the test criteria for the selected network elements as well. Here, the test criteria are criteria used for measuring a QoE between desired network elements, and can include at least one of a Packet Per Second (PPS), a packet size, a Differentiated Services Code Point (DSCP), a test link and a traffic amount. The EMS 200 can directly receive an input of the test criteria for network diagnosis from a system operator. In another exemplary embodiment, the EMS 200 can receive from the system operator an input of profile information indicating specific test criteria that are previously set for the sake of network statistic. Also, the ESM 200 can select a layer protocol used for QoE measurement in accordance with a preset scheme or in accordance with the control of the system operator. For example, the EMS 200 can select whether to perform QoE measurement using which protocol among Y.1731 PM and TWAMP.

If the test criteria are set, in step 803, the EMS 200 transmits a diagnosis command including the test criteria to a network node (or network element) corresponding to the set test criteria. At this time, the diagnosis command can include protocol information to be used for QoE measurement. Also, the diagnosis command can include a flow and test criteria by flow for which a corresponding network element will perform QoE measurement.

Thereafter, in step 805, the EMS 200 receives the diagnosis result from the corresponding network node, and proceeds to step 807 and provides the received diagnosis result to the system operator. Thereafter, the EMS 200 terminates the diagnosis procedure according to an exemplary embodiment of the present invention.

Figure 9:
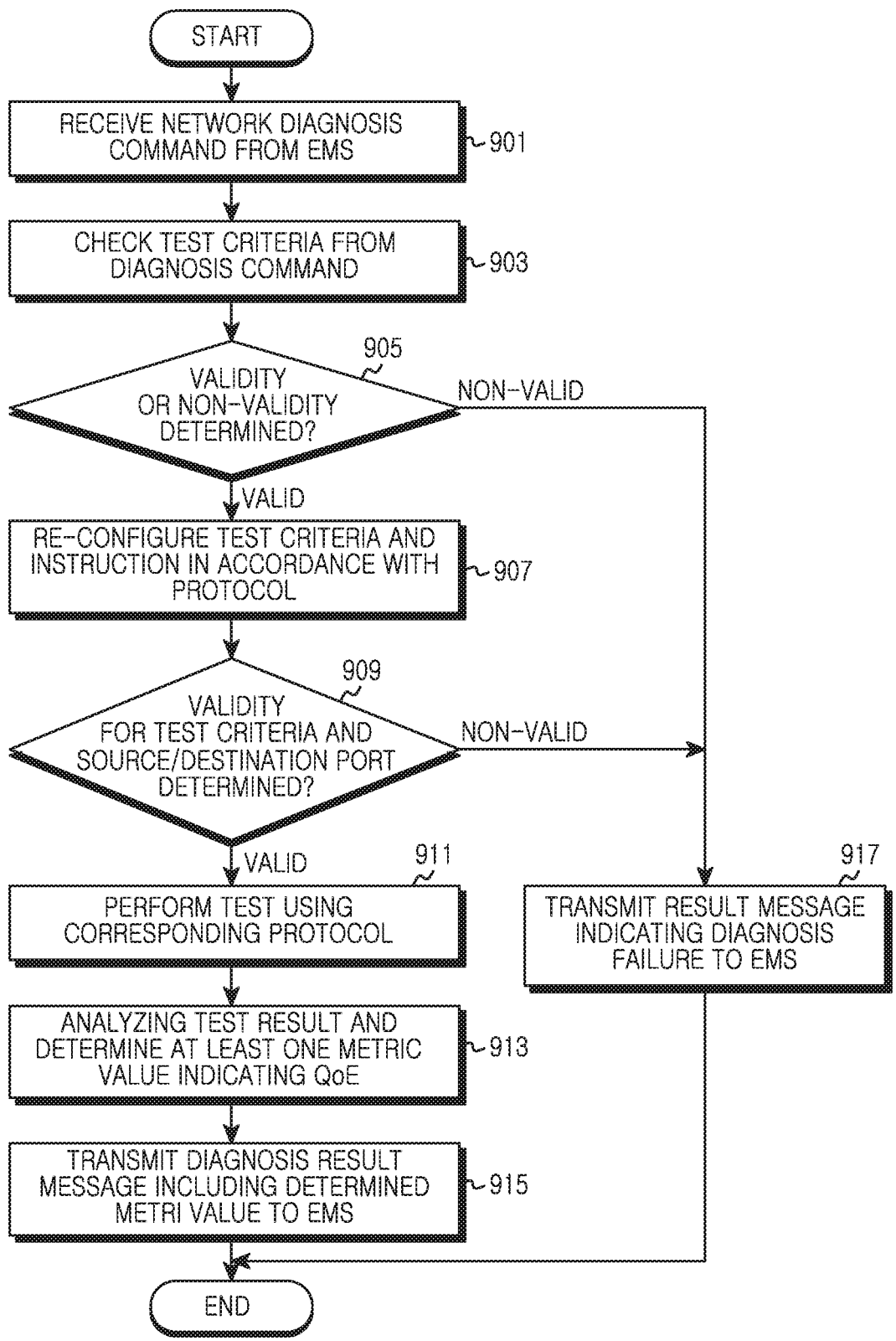
FIG. 9 is a diagram illustrating a diagnosis procedure of a network element according to an exemplary embodiment of the present invention.

FIG. 9 illustrates a diagnosis procedure of a network element according to an exemplary embodiment of the present invention.

Referring to FIG. 9, in step 901, the network element receives a network diagnosis command from the EMS 200 and, in step 903, checks test criteria from the received diagnosis command. Also, the network element can check protocol information that will be used for QoE measurement and a flow and test criteria by flow that will perform the QoE measurement, from the diagnosis command.

In step 905, the network element checks if the diagnosis command is valid. For example, the network element checks if upper network information that are possible to be set by a user have a valid value among information included in the diagnosis command. For example, the diagnosis command can include system packet processing capability information. At this time, the network element can check if the packet processing capability information has a valid value.

If it is determined that the diagnosis command is not valid, in step 917, the network element transmits a result message indicating a diagnosis failure to the EMS, and terminates the diagnosis procedure according to an exemplary embodiment of the present invention. At this time, the result message indicating the diagnosis failure can indicate a diagnosis failure cause by including the upper network information determined not to be valid.

In contrast, if it is determined that the diagnosis command is valid, the network element proceeds to step 907 and reconfigures the test criteria and an instruction in accordance with a protocol to be used for QoE measurement. Thereafter, in step 909, the network element determines the validity of the test criteria and a source/destination port. That is, the network element checks if protocol related parameters have valid values, before performing encoding in accordance with a protocol. If it is determined that at least one of the test criteria and the source/destination port is not valid, in step 917, the network element transmits a result message indicating a diagnosis failure to the EMS, and terminates the diagnosis procedure according to an exemplary embodiment of the present invention. At this time, the result message indicating the diagnosis failure can indicate a diagnosis failure cause by including information about the protocol related parameter determined not to be valid.

In contrast, if it is determined that the test criteria and the source/destination port are valid, in step 911, the network element performs a test for QoE measurement using a corresponding protocol. That is, the network element generates a packet using the corresponding protocol, and transmits the generated packet to a reflector and then, receives a packet from the reflector.

Thereafter, in step 913, the network element analyzes the packet received as the test result, and determines at least one metric value indicating a QoE. At this time, the network element can determine the at least one metric value in the scheme illustrated in FIG. 7 mentioned above.

Thereafter, in step 915, the network element generates a diagnosis result message including the determined metric value, and transmits the generated diagnosis result message to the EMS 200 and then, terminates the diagnosis procedure according to an exemplary embodiment of the present invention.

Figure 10:
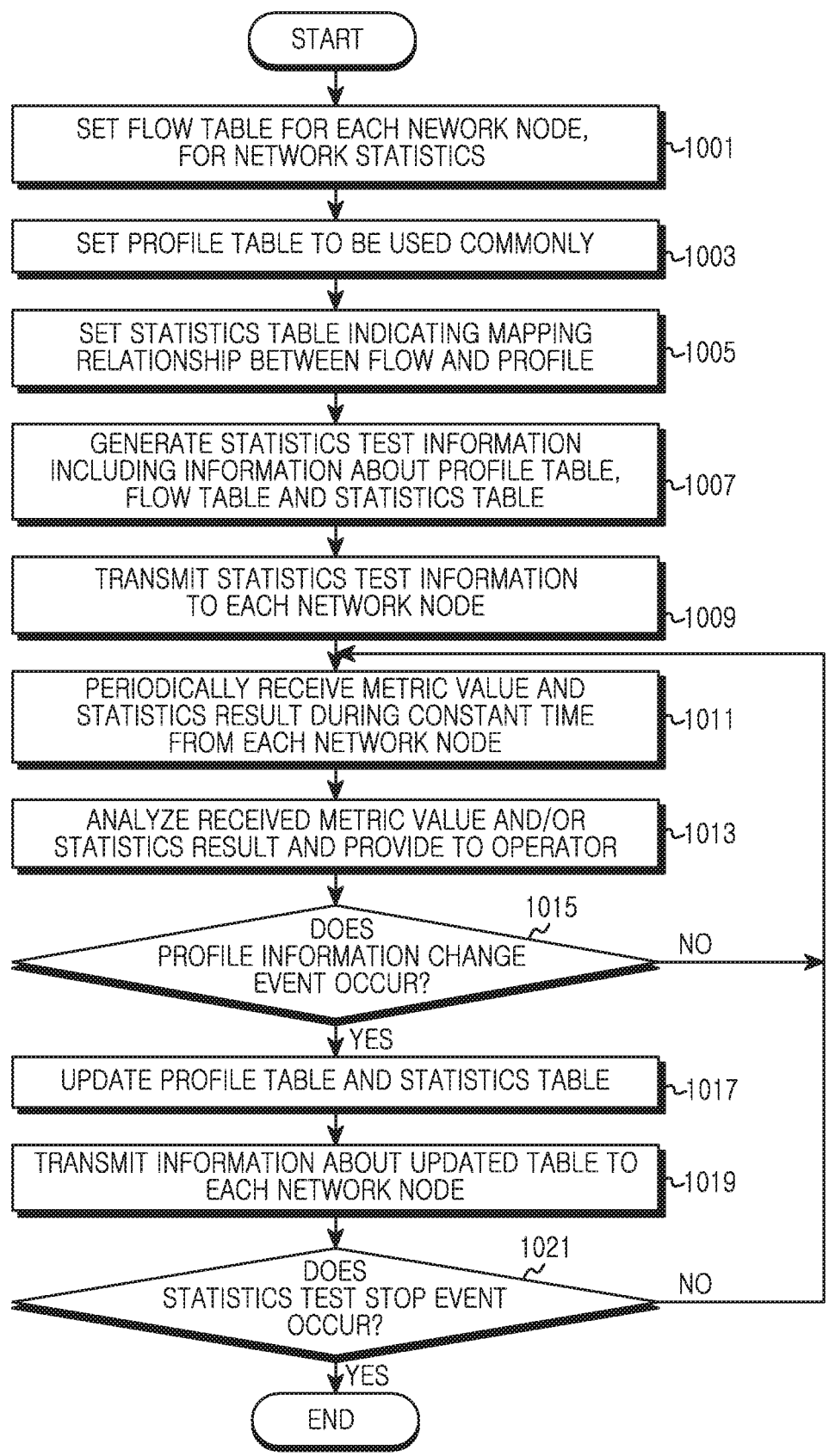
FIG. 10 is a diagram illustrating a statistics procedure of an EMS according to an exemplary embodiment of the present invention.

FIG. 10 illustrates a diagnosis procedure of an EMS according to an exemplary embodiment of the present invention. Here, in case where the EMS intends to determine a network situation during a constant time duration, the EMS can perform a statistics procedure for at least one network element. Also, the EMS can perform the statistics procedure for the at least one network element by a request of a system operator.

Referring to FIG. 10, in step 1001, the EMS 200 sets a flow table for each network node for the sake of network statistics and, in step 1003, sets a profile table that network elements will use commonly. That is, the EMS 200 sets a flow and a profile for a network constituent element. Here, the flow can mean a network element link to perform QoE measurement. Assuming that a network element that performs a role of a transmitter sending a packet is a source node and a network element that receives the packet and sends a response packet is a destination node, the flow table can include source node IP/Port (TCP, UDP) and/or destination node IP/Port (UDP) information. The profile is test criteria used for measuring a QoE of a corresponding flow, and can include a Packet Per Second (PPS), a packet size, a Differentiated Services Code Point (DSCP), a test link, a traffic amount, etc. The EMS 200 can index a profile indicating various test criteria and store in a table form. For example, it can store a profile table indicating that a test criterion of a profile 1 is "pps: 1, size: 512, DSCP: 0", and a test criterion of a profile 2 is "pps: 5, size: 200, DSCP: 23", and a test criterion of a profile 3 is "pps: 10, size: 100, DSCP: 46".

Thereafter, in step 1005, the EMS 200 can set a statistics table that indicates a mapping relationship between the flow and the profile. That is, the EMS 200 sets a table that indicates a profile to be used at QoE measurement for each flow. For example, as illustrated in FIG. 4, if three flows to have to perform QoE measurement in the base station 1 220-1 are called "EMS, Gateway, Router" respectively, the EMS 200 can set a table that indicates that a profile to be used for QoE measurement between the base station 1 220-1 and the EMS 200 is 1, and a profile to be used for QoE measurement between the base station 1 220-1 and the gateway 204 is 2, and a profile to be used for QoE measurement between the base station 1 220-1 and the router 202 is 3.

Thereafter, in step 1007, the EMS 200 generates statistics test information that includes information about the profile table, the flow table and the statistics table and, in step 1009, transmits the statistics test information to each network node. At this time, the statistics test information can include information about a QoE measurement period and/or a QoE statistics time duration. Also, the statistics test information can include protocol information to be used for QoE measurement by each network node, or include protocol information to be used for QoE measurement by flow of each network node.

Thereafter, in step 1011, the EMS 200 periodically receives a QoE metric value and/or the statistics result during a constant time from each network node. For example, the EMS 200 can receive a QoE metric value that is measured at a corresponding time point every preset QoE measurement period, and can receive the statistics result about the QoE metric value that is measured every QoE measurement period during a preset QoE statistics time duration as well. Thereafter, in step 1013, the EMS 200 analyzes the received metric value and statistics result and provides to a system operator. Because the EMS 200 provides a statistics value for a QoE between network elements in accordance with an exemplary embodiment of the present invention, a service provider can obtain an effect of being able to perform a network optimization work in the mid-to-long term.

Thereafter, in step 1015, the EMS 200 checks if a profile information change event takes place. Here, the profile information change event can take place in accordance with a request of a system operator, and can take place when a criterion previously set by the system operator is satisfied.

If the profile information change event does not occur, the EMS 200 returns to step 1011 and re-perform the subsequent steps.

In contrast, when the profile information change event occurs, in step 1017, the EMS 200 updates the profile table and the statistics table in accordance with the control of a system operator, and proceeds to step 1019 and transmits information about the updated table to each network node. That is, since the profile information is commonly used by all network nodes, when the profile information is changed, the EMS 200 transmits the changed information to all the network nodes that itself controls.

Thereafter, in step 1021, the EMS 200 checks if a statistics test stop event takes place. Here, the statistics test stop event can occur in accordance with a request of a system operator as well, and can occur when a preset criterion is satisfied as well. If the statistics test stop event does not occur, the EMS 200 returns to step 1011 and re-perform the subsequent steps.

In contrast, when the statistics test stop event occurs, the EMS 200 terminates the statistics procedure according to an exemplary embodiment of the present invention.

Figure 11:
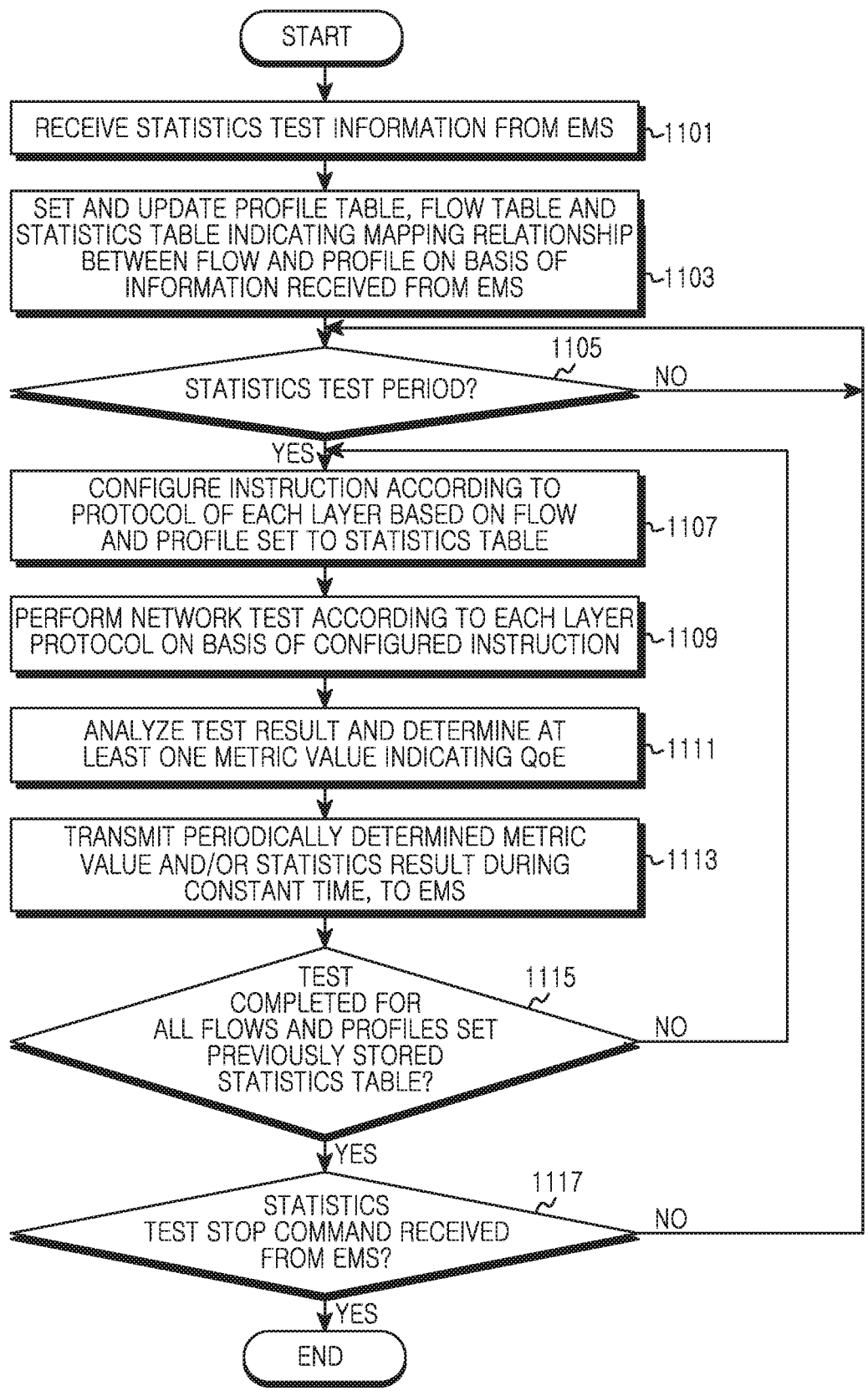
FIG. 11 is a diagram illustrating a statistics procedure of a network element according to an exemplary embodiment of the present invention.

FIG. 11 illustrates a statistics procedure of a network element according to an exemplary embodiment of the present invention.

Referring to FIG. 11, in step 1101, the network element receives statistics test information from the EMS 200 and, on the basis of the information received from the EMS, sets and updates a profile table, a flow table and a statistics table that indicates a mapping relationship between a flow and a profile. For example, as illustrated in FIG. 5, the base station 1 220-1 can set the statistics table 501, the flow table 511 and the profile table 521 on the basis of the information received from the EMS 200.

Thereafter, in step 1105, the network element checks if it is a statistics test period. Here, the statistics test period can be checked from the statistics test information received from the EMS 200.

If it is the statistics test period, the network element proceeds to step 1107 and, on the basis of a flow and a profile that have been set to the statistics table, configures an instruction according to a protocol of each layer and, in step 1109, on the basis of the configured instruction, performs a network test according to each layer protocol. At this time, the network element can check a protocol to be used at QoE measurement for each flow from the statistics test information. The network element generates a packet using the checked protocol, and transmits the generated packet to a reflector and then, receives a packet from the reflector.

Thereafter, in step 1111, the network element analyzes the packet received as the test result, and determines at least one metric value indicating a QoE. At this time, the network element can determine the at least one metric value in the scheme illustrated in FIG. 7 mentioned above.

Thereafter, in step 1113, the network element transmits a periodically determined metric value and/or the statistics result about the periodically determined metric value during a constant time, to the EMS.

Thereafter, in step 1115, the network element checks whether a test has been completed for all flows and profiles having been set to a previously stored statistics table. If the test for all the flows and profiles set to the previously stored statistics table has not been completed, the network element returns to step 1107 and performs a test for a flow and a profile for which the test has not yet been performed.

In contrast, when the test for all the flows and profiles set to the previously stored statistics table has been completed, in step 1117, the network element checks whether a statistics test stop command is received from the EMS. If the statistics test stop command is not received, the network element returns to step 1105 and checks if it is a statistics test period, and re-performs the subsequent steps.

In contrast, when the statistics test stop command is received, the network element terminates the statistics test procedure according to an exemplary embodiment of the present invention. Additionally, though not illustrated in FIG. 11, when information indicating a change of a profile is received from the EMS 200, the network element can update a profile table in accordance with the received information.

As described above, an exemplary embodiment of the present invention is describing a framework of measuring an end-to-end service quality in a network in which elements of various IP networks are compositively configured. A base protocol for measuring the end-to-end service quality applies a Two-Way Active Measurement Protocol (TWAMP) defined as standards in the Internet Engineering Task Force (IETF) that is an Internet standardization group. A scheme of measuring the service quality based on the TWAMP can test a network in various test criteria, because a plurality of service providers support the TWAMP measurement scheme and guarantee a generic purpose in a switch and a router, and a protocol itself has a high scalability.

Figure 12:
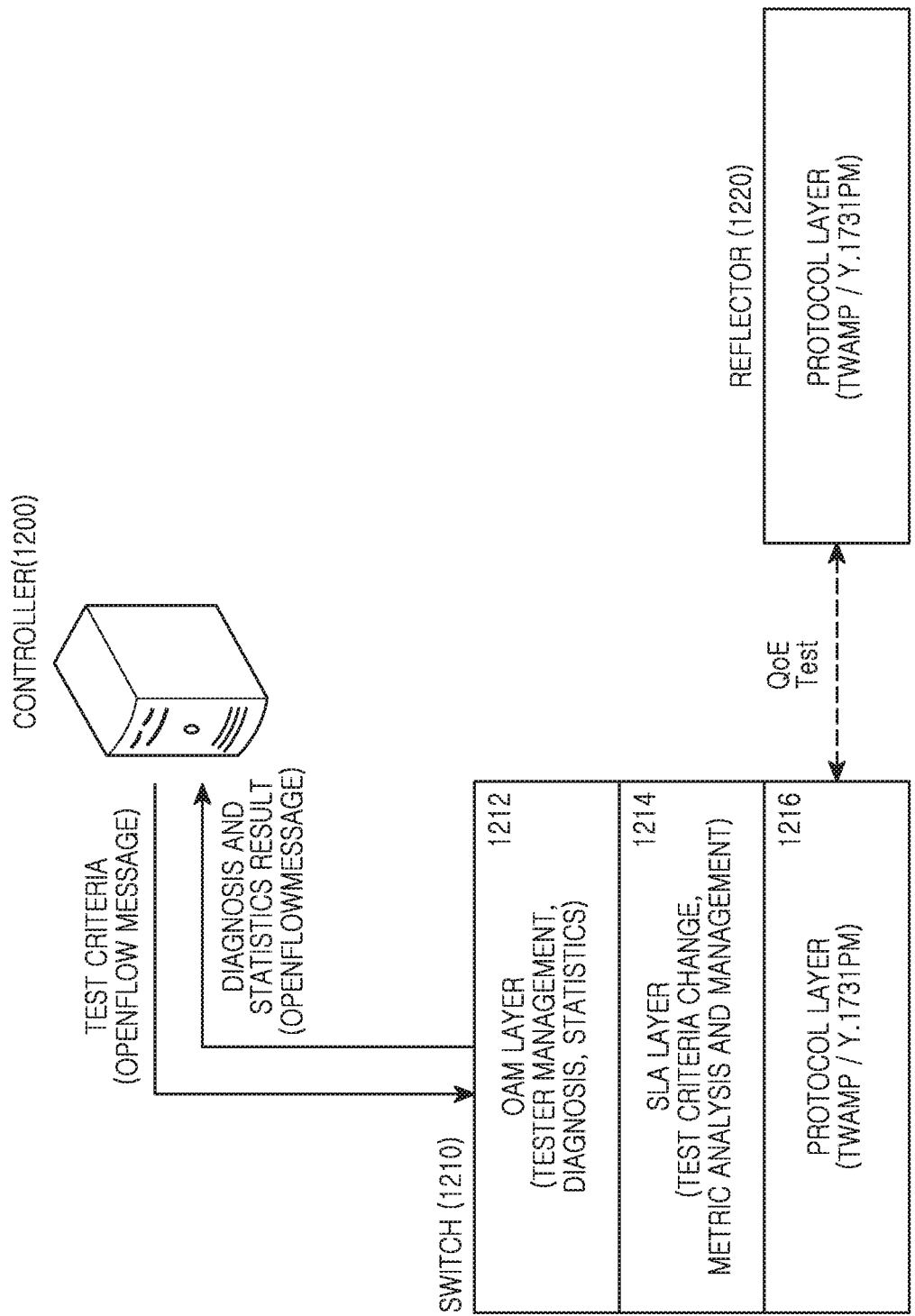
FIG. 12 is a diagram illustrating a structure of measuring a QoE in OpenFlow based SDN in accordance with an exemplary embodiment of the present invention.

Additionally, a scheme described in the present invention, i.e., a structure of controlling all network elements in the EMS can be easily adapted and applied as a structure of Software Defined Networking (SDN) as shown in FIG. 12 below.

FIG. 12 illustrates a structure of measuring a QoE in OpenFlow based SDN in accordance with an exemplary embodiment of the present invention.

Referring to FIG. 12, a controller 1200 manages each of network elements such as a switch or a router. In accordance with an exemplary embodiment of the present invention, the controller 1200 can use an application of controlling a QoE measurement function, to control QoE measurement of the network elements. Here, the QoE measurement function will be identical with a function of controlling QoE measurement of each network element in the aforementioned EMS 200. The QoE measurement function control application of the controller 1200 can set test criteria for QoE diagnosis or statistics through a user interface, and can encapsulate the set test criteria by an OpenFlow message and forward to a switch 1210 through an OpenFlow standard protocol. The controller 1200 performs a function of analyzing the OpenFlow message received from the switch 1210 and providing the QoE measurement result to a user.

The switch 1210 having received a request for QoE measurement from the controller 1200 can be comprised of an Operation, Administration and Maintenance (OAM) layer 302, a Service Level Agreement (SLA) layer 304 and a protocol layer 306, and perform QoE measurement. The switch 1210 analyzes an OpenFlow message received from the controller 1200, and transmits/receives a packet with a reflector 1220 in the same scheme as that of the aforementioned transmitter 300, to perform QoE measurement, and encapsulates the QoE measurement result by the OpenFlow message and forwards to the controller 1200.

According to an exemplary embodiment of the present invention, each network element constructing a mobile communication network measures a QoE in accordance with the control of an EMS, thereby being capable of measuring and managing an end-to-end QoE without additionally installing equipment for QoE measurement and, accordingly to this, can save an equipment investment and administration and maintenance cost. According to an exemplary embodiment of the present invention, it can exactly measure an end-to-end service quality of a user level in a network in which wired/wireless communication equipments are complicated, and can obtain an effect in which exact diagnosis is possible in real-time when a network problem occurs. Also, according to an exemplary embodiment of the present invention, because it employs an active monitoring scheme of transmitting a packet for test, it can measure a QoE in real-time when a problem occurs in a network or when network quality deterioration occurs. Also, the EMS can set desired measurement criteria for each flow and, through this, can measure and manage a service quality of substantially responding in a network when traffic is applied to each flow by desired test criteria. Also, the EMS controls and manages a flow and a profile for QoE measurement, thereby being able to support statistical monitoring in which all network constituent elements measure a QoE in the same criteria. Also, according to an exemplary embodiment of the present invention, a QoE measurement scheme can support standard network quality measurement protocols of various standards, and can acquire various QoE metric values that indicate the QoE measurement result irrespective of a quality measurement protocol. Also, it performs a function of notifying an alarm when QoE metric values violate a threshold value, thereby being able to effectively manage a network.

Each of the aforementioned constituent elements of devices (e.g., an EMS, a network element, a system, etc.) according to various exemplary embodiments of the present invention can consist of one or more components, and a name of the corresponding constituent element can be different according to the type of a corresponding device. It can include at least one of the aforementioned constituent elements of the device according to various exemplary embodiments of the present invention, and can omit some constituent elements or further include additional another constituent element. Also, some of the constituent elements of the device according to various exemplary embodiments of the present invention can be combined and constructed as one entity, thereby identically performing functions of the corresponding constituent elements before combination.

The term "module" used in various exemplary embodiments of the present invention can, for example, mean a unit including one of hardware, software, or firmware or a combination of two or more of them. The "module" can, for example, be used interchangeably with the terms "unit", "logic", "logical block", "component", "circuit", etc. The "module" can be the minimum unit of an integrally constructed component or a part thereof. The "module" can be the minimum unit performing one or more functions or a part thereof as well. The "module" can be implemented mechanically or electronically. For example, the "module" according to various exemplary embodiments of the present invention can include at least one of an Application-Specific Integrated Circuit (ASIC) chip, Field-Programmable Gate Arrays (FPGAs) or a programmable-logic device performing some operations, which are well known in the art or will be developed in the future.

According to various exemplary embodiments, at least a part of a device (e.g., modules or functions thereof) or method (e.g., operations) according to various exemplary embodiments of the present invention can, for example, be implemented as an instruction that is stored in a computer-readable storage media in the form of a programming module. In case where the instruction is executed by one or more processors (e.g., processor 320), the one or more processors can perform a function corresponding to the instruction. The computer-readable storage media can be the memory 330, for example. At least a part of the programming module can be, for example, implemented (e.g., executed) by the processor 320. At least a part of the programming module can include, for example, a module, a program, a routine, sets of instructions, a process, etc. for performing one or more functions.

The computer-readable recording media can include a magnetic media such as a hard disk, a floppy disk, and a magnetic tape, an optical media such as a Compact Disc-Read Only Memory (CD-ROM) and a Digital Versatile Disc (DVD), a Magneto-Optical Media such as a floptical disk, and a hardware device specially configured to store and perform a program instruction (e.g., the programming module) such as a Read Only Memory (ROM), a Random Access Memory (RAM), a flash memory, etc. Also, a program command can include not merely a mechanical language code such as a code such as that made by a compiler, but also a high-level language code that is executable by a computer by using an interpreter, etc. The aforementioned hardware device can be configured to operate as one or more software modules so as to perform operations of various exemplary embodiments of the present invention, and vice versa.

The module or programming module according to various exemplary embodiments of the present invention can include at least one or more of the aforementioned constituent elements, or omit some of the aforementioned constituent elements, or include additional another constituent element. Operations carried out by the module, the programming module or another constituent element according to various exemplary embodiments of the present invention can be executed in a sequential, parallel, repeated or heuristic method. Also, some operations can be executed in another order or be omitted, or another operation can be added. While a concrete exemplary embodiment has been described in a detailed description of the present invention, various modifications are possible without departing from the scope of the present invention. Therefore, the scope of the present invention should not be limited and defined to the described exemplary embodiment and should be defined by not only claims described later but also equivalents to these claims.

The invention claimed is:

1. A method of a network element for measuring a user quality of experience in a network, the method comprising:
   receiving a user quality-of-experience measurement request message that comprises user quality-of-experience measurement criteria for a link between the network element and another network element, from a system controller;
   transmitting a test packet to the another network element;
   receiving a response packet from the another network element; and
   transmitting, to the system controller, a user quality-of-experience measurement result that is determined based on the response packet;
   wherein the user quality-of-experience measurement result indicates notifying a user quality-of-experience measurement failure comprising a failure cause if the link and the user quality-of-experience measurement criteria have an invalid value,
   wherein the link comprises at least one of IP/port information of the network element operating as a transmitter and IP/port information of the another network element operating as a reflector,
   wherein the user quality-of-experience measurement criteria comprise at least one of a packet per second (PPS), a packet size, a test link, or a traffic amount, and
   wherein the failure cause comprises information determined to be invalid from the link and the user quality-of-experience measurement criteria.

2. The method of claim 1, wherein the network element and the other network element comprise at least one of a base station, a switch, a router, or a gateway.

3. The method of claim 1, wherein transmitting the user quality-of-experience measurement result to the system controller comprises
   transmitting the user quality-of-experience measurement result of a user quality-of-experience measuring time for the link or a statistics result about a user quality of experience periodically measured.

4. The method of claim 1, further comprising
   receiving a criteria table that indexes the user quality-of-experience measurement criteria,
   wherein measuring the user quality of experience for the link based on the user quality-of-experience measurement criteria comprises checking the user quality-of-experience measurement criteria in the criteria table based on a criteria index that is comprised in the user quality-of-experience measurement request message.

5. The method of claim 1, further comprising:
   acquiring at least one of a sequence, a time stamp, a received packet number, or size and time to live (TTL) information using a raw data of the received response packet; and
   determining one metric indicating a user quality of experience using the acquired at least one TTL information.

6. The method of claim 5, wherein the one metric comprises at least one of a bandwidth, a packet loss, rearranging, duplicate, validity, connectivity, packet delay, statistical jitter, real-time jitter, an R-value, or a mean opinion score.

7. An apparatus of a system controller for measuring a user quality of experience in a network, the apparatus comprising:
   at least one processor; and
   a transceiver configured to be operationally connected with the at least one processor, wherein the at least one processor is configured to:
      set user quality-of-experience measurement criteria about a link between a network element and another network element,
      transmit, to the network element, a user quality-of-experience measurement request message that comprises the user quality-of-experience measurement criteria,
      receive a user quality-of-experience measurement result from the network element, wherein the user quality-of-experience measurement result indicates a user quality-of-experience measurement failure comprising a failure cause if the link and the user quality-of-experience measurement criteria have an invalid value,
      provide the received user quality-of-experience measurement result to a system operator, and
      generate a criteria table that indexes the user quality-of-experience measurement criteria,
   wherein the link comprises at least one of IP/port information of the network element operating as a transmitter and IP/port information of the another network element operating as a reflector, and
   wherein the user quality-of-experience measurement criteria comprise at least one of a packet per second (PPS), a packet size, a test link, or a traffic amount,
   wherein the failure cause comprises information determined to be invalid from the link and the user quality-of-experience measurement criteria,
   wherein the criteria table that indexes the user quality-of-experience measurement criteria is commonly used in all network elements.

8. The apparatus of claim 7, wherein the at least one processor is further configured to request the user qualityof-experience measurement result of a user quality-of-experience measuring time for the link or a statistics result about a user quality of experience periodically measured.

9. The apparatus of claim 7, wherein the at least one processor is further configured to set a network element link that will be measured as a user quality-of-experience and select the user quality-of-experience measurement criteria for the set link in a criteria table.

10. An apparatus of a network element for measuring a user quality of experience in a network, the apparatus comprising:
at least one processor, and
a transceiver configured to be operationally connected with the at least one processor, wherein the at least one processor is configured to:
receive a user quality-of-experience measurement request message that comprises a user quality-of-experience measurement criteria for a link between the network element and another network element, from a system controller,
acquire a user quality-of-experience measurement result from a packet received from the other network element; and
transmit a test packet to the another network element,
receive a response packet from the other network element,
transmit, to the system controller, a user quality-of-experience measurement result that is determined based on the response packet, and
wherein the user quality-of-experience measurement result indicates user quality-of-experience measurement failure with a failure cause if the link and the user quality-of-experience measurement criteria have an invalid value,
wherein the link comprises at least one of IP/port information of the network element operating as a transmitter and IP/port information of the another network element operating as a reflector, and
wherein the user quality-of-experience measurement criteria comprise at least one of a packet per second (PPS), a packet size, a test link, or a traffic amount,
wherein the failure cause comprises information determined to be invalid from the link and the user quality-of-experience measurement criteria.

11. The apparatus of claim 10, wherein the network element and the other network element comprise at least one of at least one of a base station, a switch, a router, or a gateway.

12. The apparatus of claim 10, wherein the at least one processor is further configured to transmit a user quality-of-experience measurement result of a current time point about the link or a statistics result about a user quality of experience periodically measured.

13. The apparatus of claim 10, wherein the at least one processor is further configured to:
receive a criteria table that indexes the user quality-of-experience measurement criteria; and
check the user quality-of-experience measurement criteria in the criteria table based on a criteria index that is comprised in the user quality-of-experience measurement request message.

14. The apparatus of claim 10, wherein the at least one processor is further configured to:
acquire at least one of a sequence number, a time stamp, a received packet number, or size and time to live (TTL) information using a raw data of the received response packet; and
determine at least one metric indicating a user quality of experience using the acquired at least one TTL information.

15. The apparatus of claim 14, wherein the at least one metric comprises at least one of a bandwidth, a packet loss, rearranging, duplicate, validity, connectivity, packet delay, statistical jitter, real-time jitter, an R-value, or a mean opinion score.

16. The apparatus of claim 7, wherein the at least one processor is configured to control a user quality-of-experience measurement of network elements using an application for controlling a user quality-of-experience measurement function.

17. The apparatus of claim 10, wherein the at least one processor is configured to be controlled by an application for controlling a user quality-of-experience measurement function.

* * * * *